(No Model.)
L. C. PERKINS.
CLUTCH.
No. 284,475. Patented Sept. 4, 1883.
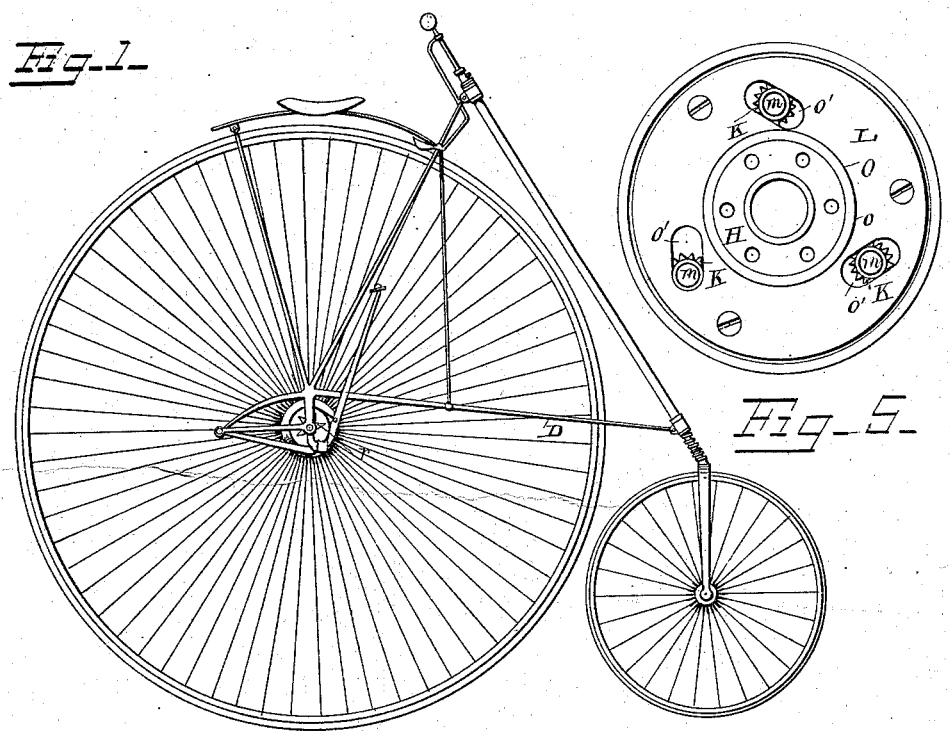
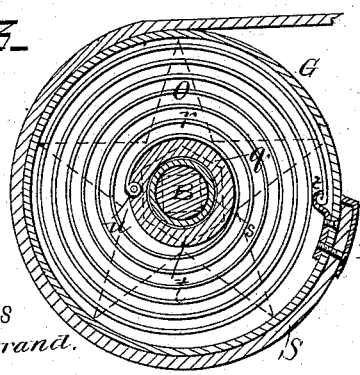
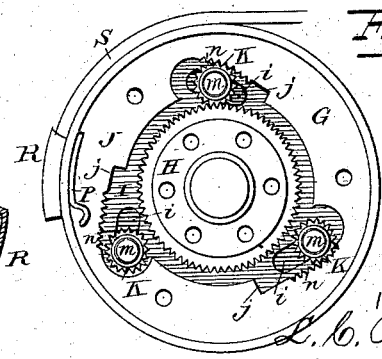
WITNESSES
F. L. Ourand.
E. G. Siggers.
INVENTOR
L. C. Perkins,
by C. A. Snow & Co.
Attorneys

UNITED STATES PATENT OFFICE.

LYMAN C. PERKINS, OF PHILADELPHIA, PENNSYLVANIA.

CLUTCH.

SPECIFICATION forming part of Letters Patent No. 284,475, dated September 4, 1883.

Application filed July 27, 1883. (No model.)

*To all whom it may concern:*

Be it known that I, LYMAN C. PERKINS, a citizen of the United States, residing at Philadelphia, in the county of Philadelphia and State of Pennsylvania, have invented a new and useful Clutch, of which the following is a specification, reference being had to the accompanying drawings.

This invention relates to clutches; and it has for its object to change a rocking or oscillating movement into a rotary motion, a special object of the invention being to supply a positive and noiseless clutch to the "Star" bicycle, in place of the noisy, uncertain one now in use.

To attain the aforesaid objects the said invention consists in certain details of construction and combination of parts, as hereinafter fully set forth, and particularly pointed out in the claims.

In the accompanying drawings, Figure 1 is a view of a Star bicycle having my improved clutch applied to the axle thereof. Fig. 2 is a longitudinal section through the axle. Fig. 3 is a cross-section through the clutch mechanism. Fig. 4 is a plan view having the inner plate removed, and Fig. 5 is a similar view with the top plate removed.

Like letters refer to corresponding parts in the several figures.

Referring to the drawings, it will be seen that I have shown my improved clutch applied to the main axle of the Star bicycle, and in the description hereinafter set forth I have described my invention with reference to its application to the Star bicycle; but it will be obvious that the clutch can be applied to any mechanism to which it could be adapted, in order to change a rocking or oscillating movement into a rotary motion.

In said drawings, A designates the action of the bicycle, consisting of a hollow rotary shaft or sleeve, C, through which passes a stationary shaft, B, the rear ends of the reach D being immovably connected to the latter.

At each end of the hollow shaft C is formed the hubs E, provided with openings through which is passed the spokes of the wheel. The said hubs are formed with screw-threaded extensions F, to which are secured the boxes G, containing the clutch mechanism, said extensions being provided with an opening through the same to allow the passage of the shaft B.

In the middle of the boxes is fastened the gear-wheel H, which is formed with a screw-threaded central opening, through which is passed the extension F, the gear-wheel being screwed on the extension, so that when said wheel is turned it will transmit motion to the hubs and from thence to the wheel of the bicycle. On the bottom plate of the boxes G is fitted an inner plate, I, which is formed with three elliptical slots, $i$, while a side wall, J, is erected upon the inner plate. Slots or recesses $j$ are cut from the side wall, corresponding in number and shape to the slots $i$ in the inner plate, the recesses being adjacent to the slots. A series of cogs, K, are placed in the recesses of the side wall, each cog working at its lower end in the slots $i$ and engaging with teeth $n$, formed on the side wall at the recesses, as the cogs are revolved by contact with the gear. Openings $k$ are bored centrally through the cogs, and in said openings are fitted springs $l$ and plugs $m$, the latter being placed in the openings at the top and bottom of the springs. The cogs K engage with gear-wheel H, as hereinafter explained, and in the movements of the cogs the side wall serves to guide the same while also holding them straight and square.

A plate, L, having central opening, $o$, and elliptical slots $o'$, is placed over and secured to the side wall, J, the cogs extending through and working in the slots, while the opening $o$ permits the plate to fit nicely around the extension F, carrying the gear-wheel, so that the plate is flush with the gear-wheel. A groove, $p$, is cut from around the periphery of said plate L, and in the groove a suitable packing, M, is fitted, thereby making the clutch dust-proof.

N designates another plate, covering the mechanism above described, said plate being attached to the gear-wheel, and thus when the gear-wheel with the rotary sleeve is operated the plate N will turn with the same.

O is a spring coiled inside the box, above plate N, the outer end of the spring being fastened to the box by a plate, P. A leather cap, Q, having a collar, $q$, provided with a plate in the shape of a star, as at r, and a sleeve, s, moving within the collar, is fitted over the spring at the outer end of the box G. This sleeve is formed with a square opening, which fits over the outer end of stationary shaft B, the latter being also formed square at said end to receive the opening of the sleeve. The star-collar q fits over the sleeve, and is formed with a notch, u, which receives the inner end of the spring O, and thus the collar and sleeve are arranged in the center of the spring. By turning the star r the collar q is likewise turned, causing the spring to be wound up, and then by tightening the set-nut t, which screws over the end of the sleeve, the star r will be clamped against the leather cap Q, thereby preventing the collar and star-shaped plate from returning to their former positions. Since the shaft B' is stationary and the sleeve fits tightly over the same, the sleeve will be held from turning independently of the shaft B, and, by reason of the connection with the set-nut t, the said sleeve will hold said nut from turning loose, and thus the star-shaped plate and collar will retain the spring wound up until the set-nut t has been released from the same.

The means above stated provides for the ready and efficient adjustment of the springs, so as to increase the tension thereof.

On the outer surface of the boxes G are secured brackets R, the latter conforming to the shape of the boxes, and provided with the straps S, secured in the brackets and wound around the boxes.

In operation it will be seen that when the treadles are depressed the straps are drawn upon, causing the rotation of the boxes G. The springs in the cogs press the plugs outward, and it will also be seen that the cogs are always engaged with the teeth n. Thus the boxes and cogs move in one direction, while the gear-wheel H, extension F, and plate N move practically in the opposite direction. The springs press the plugs outward against the plate N, and as the boxes G are rotated the frictional contact of the plugs with said plate will force the cogs K into engagement with the gear-wheel H, when a positive lock is formed, and remains so until the straps have been unwound. Since the cogs are carried around with the boxes and engage with the gear-wheel, as stated, the latter is rotated, and rotation is imparted to the hollow shaft C, and from thence to the wheel. The springs O are coiled or wound up by the rotation of the boxes, and, when the treadles have been depressed and let go, the springs exert their power, rotate the boxes in the opposite direction, the cogs engaging with the teeth n in the side wall, and the straps S being again wound upon the surfaces of the boxes, thus restoring the treadles to their normal positions, ready to be forced down anew.

By this arrangement a positive noiseless clutch is obtained which is specially applicable to take the place of the noisy uncertain clutch at present used on the Star bicycle; but it is obvious that it can be used on any machinery when it is found necessary to change an oscillating motion into rotary.

It will be apparent that numerous modifications can be made in the foregoing without departing from the spirit or scope of my invention.

Having described my invention, I claim as my own—

1. In a clutch, the boxes provided with gear-wheel H, and a series of cogs arranged around said gear-wheel, for the purpose set forth.

2. In a clutch, the boxes connected to the hubs E, and provided with gear-wheel H, fitting around an extension of said hubs, and a series of cogs arranged around said gear-wheel, for the purpose set forth.

3. In a clutch, the boxes provided with gear-wheel H, and a side wall, J, slots or recesses cut from the side wall, and a series of cogs arranged around said gear-wheel and fitting in the recesses of the side wall, as set forth.

4. In a clutch, the boxes G, provided with gear-wheel H, and a side wall, J, slots or recesses cut from the side wall, a series of cogs arranged around the gear-wheel and fitting in the recesses of the side wall, a plate, N, moving with the gear-wheel, and a spring coiled inside the boxes outside of said plate, for the purpose set forth.

5. In a clutch, the boxes provided with gear-wheel H, a series of cogs arranged around the gear-wheel, and coiled springs l, fitted within openings bored centrally through the cogs, for the purpose set forth.

6. In a clutch, the boxes G, having their inner plates formed with elliptical slots i, and a side wall erected upon said plates, slots or recesses cut from the side wall and corresponding to the slots i, and a series of cogs fitting within the recesses of the side wall, said cogs having an opening bored centrally therein in which coiled springs l are fitted, for the purpose set forth.

7. In a clutch, the boxes G, having their inner plates formed with elliptical slots i, and a side wall erected upon said plates, slots or recesses cut from the side wall and corresponding to the slots i, a series of cogs fitting within the recesses and engaging with the teeth n, coiled springs fitted within openings bored centrally through the cogs and provided with plugs m, a plate, L, secured to the side wall and having slots o', and a plate, N, covering the plate L, substantially as set forth.

8. In a clutch, the boxes G, having their inner plates formed with elliptical slots i, and a side wall erected upon said plates, a gear-wheel, H, inclosed by the side wall, slots or recesses cut from the side wall and corresponding to the slots i, a series of cogs fitting within the recesses and engaging with teeth n, coiled springs fitted within openings bored centrally through the cogs and provided with plugs m, a plate, L, secured to the side wall, and having slots o', a plate, N, covering plate L and working with gear-wheel H, and a spring coiled around the boxes outside of plate N, for the purpose set forth.

9. In a clutch, the springs O, coiled inside the boxes, the outer ends being fastened by a plate, P, to the same, a leather cap having a collar, q, provided with a star-shaped plate, r, and a movable sleeve, s, arranged and adapted to adjust the springs in the manner set forth.

In testimony that I claim the foregoing as my own I have hereto affixed my signature in presence of two witnesses.

LYMAN CHURCHILL PERKINS.

Witnesses:
FRANK P. BEAL,
CHARLES H. THORNTON.